US006692285B2

(12) United States Patent  
Islam (10) Patent No.: US 6,692,285 B2
(45) Date of Patent: Feb. 17, 2004

(54) PUSH-ON, PULL-OFF COAXIAL CONNECTOR APPARATUS AND METHOD

(75) Inventor: Nahid Islam, Westmont, IL (US)

(73) Assignee: Andrew Corporation, Orland Park, IL (US)

( * ) Notice: Subject to any disclaimer, the term of this patent is extended or adjusted under 35 U.S.C. 154(b) by 41 days.

(21) Appl. No.: 10/104,565

(22) Filed: Mar. 21, 2002

(65) Prior Publication Data

US 2003/0178845 A1 Sep. 25, 2003

(51) Int. Cl.[7] .............................................. H01R 13/627
(52) U.S. Cl. ........................ 439/352; 439/675; 439/578
(58) Field of Search ................................ 439/578, 352, 439/353, 355, 675

(56) References Cited

U.S. PATENT DOCUMENTS

| | | | |
|---|---|---|---|
| 3,671,922 A | 6/1972 | Zerlin et al. ................... 339/74 |
| 3,694,793 A | 9/1972 | Concelman ................... 339/91 |
| 4,138,181 A | * 2/1979 | Hacker et al. ............... 439/258 |
| 4,268,115 A | 5/1981 | Slemon et al. ........... 350/96.21 |
| 4,545,633 A | 10/1985 | McGeary ..................... 339/42 |
| 4,941,846 A | 7/1990 | Guimond et al. ........... 439/578 |
| 5,269,701 A | 12/1993 | Leibfried, Jr. .............. 439/578 |
| 5,393,246 A | * 2/1995 | Du .............................. 439/482 |
| 5,683,263 A | * 11/1997 | Hsu ............................ 439/319 |
| 5,746,619 A | * 5/1998 | Harting et al. .............. 439/352 |
| 5,802,710 A | 9/1998 | Bufanda et al. ............. 439/578 |
| 5,993,253 A | 11/1999 | Sai .............................. 439/578 |
| 6,019,622 A | * 2/2000 | Takahashi et al. ........... 439/188 |
| 6,019,636 A | * 2/2000 | Langham ..................... 439/584 |
| 6,210,221 B1 | 4/2001 | Maury ......................... 439/578 |
| 6,257,919 B1 | 7/2001 | Cutler et al. ................. 439/441 |
| 6,267,612 B1 | 7/2001 | Arcykiewicz et al. ....... 439/253 |
| 6,270,367 B1 | * 8/2001 | Bussard ....................... 439/188 |
| 6,361,348 B1 | * 3/2002 | Hall et al. ................... 439/352 |
| 6,478,618 B2 | * 11/2002 | Wong ......................... 439/585 |

\* cited by examiner

*Primary Examiner*—Truc Nguyen
(74) *Attorney, Agent, or Firm*—Jenkens & Gilchrist (57) ABSTRACT

A male coaxial connector adapted for receiving a female connection member. The male coaxial connector defines an axial direction along its major axis. The male coaxial connector includes a spring basket biased towards an open position which is positioned around a male connection member. The spring basket is adapted for engaging the female connection member. The male coaxial connector also includes a sleeve reciprocally positioned around the spring basket and the male connection member. The sleeve is movable in the axial direction with respect to the spring basket such that when the sleeve is in a forward position or rearward position with respect to the spring basket, the spring basket is in an open position. The female connection member can be released from or inserted into the spring basket when the spring basket is in its open position. When the sleeve is in a neutral position with respect to the spring basket, the sleeve is in engagement with the spring basket forcing the spring basket into a closed position such that the spring basket applies a radially compressive force on the female connection member. The male coaxial connector also includes a first spring positioned around the male connection member. The first spring provides an axial force on the male connection member which forces the male connection member into engagement with the female connection member.

37 Claims, 9 Drawing Sheets

PUSH-ON, PULL-OFF COAXIAL CONNECTOR APPARATUS AND METHOD

BACKGROUND OF THE INVENTION

1. Field of the Invention

The present invention relates generally to coaxial cable connectors and, more particularly, but not by way of limitation, to push-on, pull-off coupling mechanisms for coaxial cable connectors.

2. History of Related Art

A coaxial cable is generally characterized by having an inner conductor, an outer conductor, and an insulator between the inner and outer conductors. The inner conductor may be hollow or solid. At the end of coaxial cable, a connector is attached forming a coaxial cable assembly and facilitating mechanical and electrical coupling of the coaxial cable to electronic equipment and other cables. The method of and apparatus for the mechanical and electrical coupling of the connector to the coaxial cable has for a number of years been the subject of considerable design innovation. For example, to effectuate electrical contact between the inner contact of the connector and the inner conductor of the cable, the inner contact may be soldered or otherwise secured in some other fashion to the inner conductor. To effectuate electrical contact between the body member of the connector and the outer conductor of the cable, a myriad of design issues arise. One design issue relates to the configuration of the outer conductor of the cable. A connector for a coaxial cable having an outer conductor and a hollow, plain cylindrical inner conductor is, for example, described in U.S. Pat. No. 3,199,061 (Johnson et al.). The Johnson patent describes a self-tapping connector. Such connectors are time-consuming to install and relatively expensive to manufacture. Also, when the inner connector is made of brass, over-tightening causes the threads to strip off the connector rather than the end portion of the inner conductor of the cable, and thus the connector must be replaced. More recent coaxial connector designs have addressed methods of and apparatus for quickly and easily attaching a connector to a coaxial cable with improved efficiency. U.S. Pat. No. 5,802,710, assigned to the assignee of the present invention, and incorporated herein by reference, teaches a method of attaching a connector to a coaxial cable that allows the depth of the inner contact relative to the body member of the connector to be easily controlled. In this manner, the depth of the inner contact relative to the body member of the connector is consistent from one assembly to the next. The method set forth therein also provides a moisture barrier between the cable and the connector without the use of rubber O-rings, thereby protecting the connector from detrimental environmental conditions.

Another very important design aspect of coaxial connectors has been, and currently is, the coupling mechanism that facilitates an interlocking engagement between mating male and female coupling sections. For example, U.S. Pat. No. 4,941,846 (Guimond, et al.) describes a quick connect/disconnect connector for coaxial cables which can be used with unmodified standard coaxial couplings having externally facing threads. The connector includes a connector housing having a plurality of movable fingers which have inwardly facing ridge portions that mesh with the externally facing threads of the coaxial coupling. When the connector coaxial line segment is pushed onto the coupling, the fingers move in such a way as to allow the ridge portions to interlock with the screw threads. The connector can be used for RF microwave such as SMA, TNC, Type N, etc. Disconnecting is accomplished by pulling the sleeve backward which releases the fingers from their interlocking position.

Another connector design addressing the coupling mechanism is set forth and shown in U.S. Pat. No. 4,138,181 (Hacker, et al.). The Hacker patent describes a releasable electrical connector having a receptacle component and a plug component which can be mated by relative rotation between the components and separated by a straight breakaway force. Pins on the receptacle components are engaged in a spring biased sleeve in the plug component. Moreover, a spring is provided around the male coaxial connector and biases the connector body toward the receptacle to provide better contact between the connectors.

Likewise, U.S. Pat. No. 4,545,633 (McGeary) generally describes a male plug and a female receptacle that are connected together by means of fingers on the male plug which are spread and are held by the female receptacle. The connector is unplugged by sliding a sleeve rearwardly against an internal spring and moving the locking tabs to an unlocked position.

Similarly, U.S. Pat. No. 6,267,612B1 (Arcykiewicz, et al.) teaches an adaptive coupling mechanism incorporating a multi-lined locking ring to engage the threads of a conventional rotational coupling system member.

These and related designs exemplify the innovation in the effort for improved high performance coaxial cable connector couplings that are easy and fast to install and uninstall one to the other under field conditions and which may also be economically manufactured.

It has been well established that connectors incorporating push-pull coupling assemblies permit faster installation than the threaded coupling assemblies. Typical push-pull couplings also often provide more reliable locking mechanisms because vibrations will have a less tendency to cause disconnection as compared to threaded connectors which are more prone to the deleterious effect of vibration. There are obviously no "cross-threading" problems with push-pull connectors, because such problems are by definition the problem of threaded engagement. Also, push-pull connectors are quicker to connect or disconnect. However, threaded coupling assemblies, when installed correctly, are more physically secure (they do not disconnect when something pulls on them) whereas push-pull connectors, by definition, disconnect when a sufficient axial force is applied. However, to connect the typical push-pull connectors, the connector must be pulled in a rearward direction with respect to the female end to allow the connector to "open up". Stated another way, the only way to "open up" the connector to allow receipt of a female end is to move the connector in a rearward direction; the connector cannot "open up" by moving the connector towards the female end. Then the connector may be pushed onto the female end and the connector is moved back to its default position to lock the connector in place. This may be cumbersome in the field because the user must pull the connector back while pushing the entire assembly into engagement with the female end.

It would be a distinct advantage to provide a push-on, pull-off connector that quickly connects with a standard threaded female coaxial end, without having to screw the connector on to the female end, that provides efficient and reliable coupling of the male and female connector members under field conditions. Also, it would be advantageous if the connector could allow receipt of the female end by either pushing or pulling the connector with respect to the female end. Enhanced coupling aspects, such as increased axial compression between male and female connection members, provide improved reliability. The present invention provides such a reliable coaxial connector coupling with a reciprocally mounted sleeve positionable around a connector member in three separate positions for enhanced ease of coupling/decoupling to a female end. The push-pull connector described herein includes a pair of springs for urging the female connector into engagement with the male coaxial connector while providing both locked and unlocked positions therebetween.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF THE PREFERRED EMBODIMENTS

It has been discovered that a reciprocally mounted push-on, pull-off coupling assembly formed with means for enhancing the axial interface force between male and female connector members of a coaxial connector can provide a myriad of advantages and improved reliability. Similarly, it has been discovered that a male coaxial connector that is adapted for receipt of a female connector when it is pushed forward or rearward with respect to a female connector improves the ease of use in the field. The push-on, pull-off coupling assembly of the coaxial connector of the present invention is constructed for axially biasing the mating coupling members of the coaxial connector of the present invention into each other. The inter-engagement of the axially biased coaxial coupling members of the present invention provides a tighter, more reliable connection with the quick installation convenience provided by a connector that can be connected or released in two distinct ways. The coupling assembly of the coaxial connector of the present invention also provides radial forces to ensure sufficient engagement between the male and female connection members.

Figure 1:
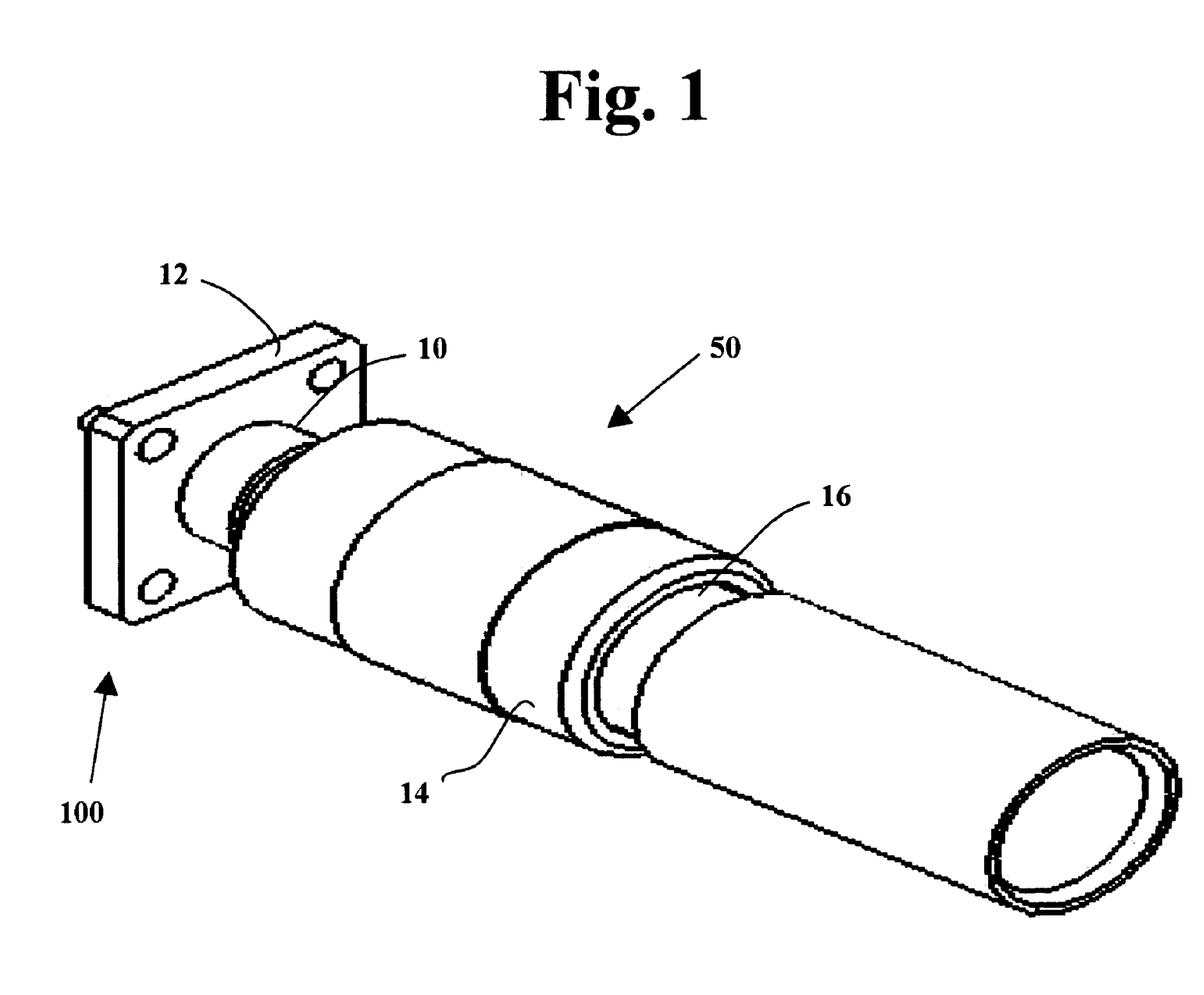
FIG. 1 is a perspective view of one embodiment of a male coaxial connector constructed in accordance with the principles of the present invention, the male coaxial connector being in a mated and locked position with respect to a female connector.

Referring first to FIG. 1 there is shown a perspective view of one embodiment of a male coaxial connector 50 constructed in accordance with the principles of the present invention, the male coaxial connector 50 being in a mated and locked position with respect to a female connector 100. The female connector 100 of the present embodiment is a SMA female connector. It may be a panel mount or cable assembly connector and is shown here for purposes of illustration. Thus, female connector 100 may be connected to a structure such as a radio antenna by way of panel 12. In order to accommodate the female connector 100, a sleeve 14 is provided that fits around the female connector 100 when the male coaxial connector 50 is engaged. In order to receive a female connection member 10 of a female connector 100, the sleeve 14 has an open front end. In order to receive the male connection member 16, the sleeve has an open rear end. The design and assembly of the male coaxial connector 50, including the reciprocally mounted sleeve 14, will be described in more detail below.

For the male coaxial connector 50 to work for its intended purpose it must be mounted at the end of a coaxial cable (as must the female connector 100). Such methods of connection are well known in the art. The preferred method for connection of the male coaxial connector 50 to a coaxial cable is disclosed in U.S. Pat. No. 5,802,710 which is incorporated by reference herein for such teachings. The male coaxial connector 50 of the present invention may be mounted to either corrugated coaxial cables or smooth-walled coaxial cables.

Figure 2:
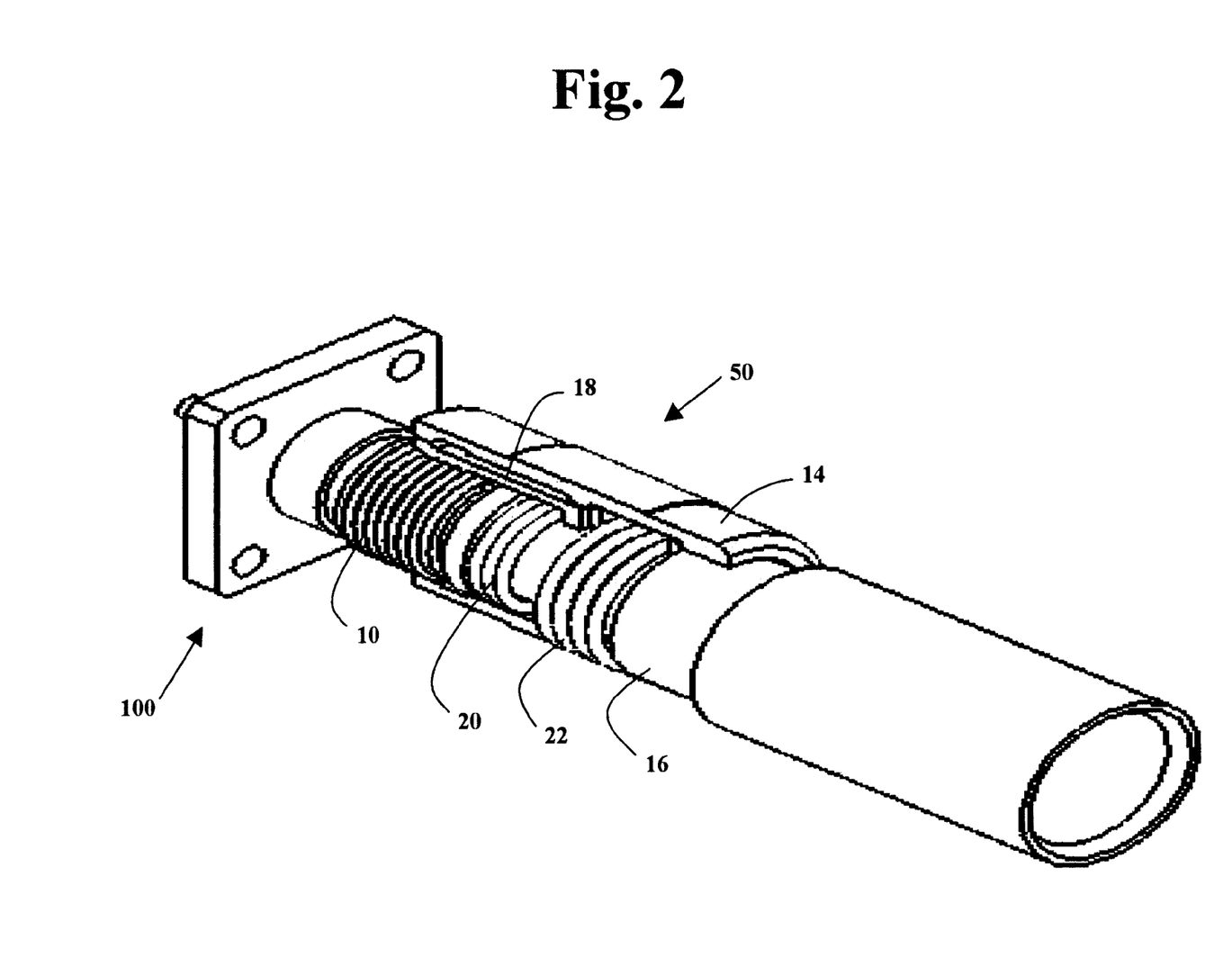
FIG. 2 is a perspective, cross-sectional view of the male coaxial connector of FIG. 1.

Referring now to FIG. 2, there is shown a perspective, cross-sectional view of the male coaxial connector 50 of FIG. 1. In order to provide outer electrical communication between the male coaxial connector 50 and the female connector 100, the female connection member 10 abuts the male connection member 16 and both connection members are constructed of electrically conductive material (note that the male connection member 16 extends within the sleeve 14—this will be more readily apparent from the drawings that follow). These connection members serve as the outer conductors of the coaxial connection between the male and female connectors. The preferred embodiment of the male coaxial connector 50 contains a first spring 22 that biases the sleeve 14 towards a locked position and a second spring 20 that helps provide axial force on the male connection member 16 to ensure proper electrical engagement with the female connector 100. This relationship will be discussed in further detail below. A spring basket 18, fits around the front end of the male connection member 16 and is adapted for receipt of the female connection member 10. The spring basket 18 provides a radial compressive force on the female connection member 10 when the male coaxial connector 50 is in its mated, locked position. This relationship will also be discussed in further detail below.

Figure 3:
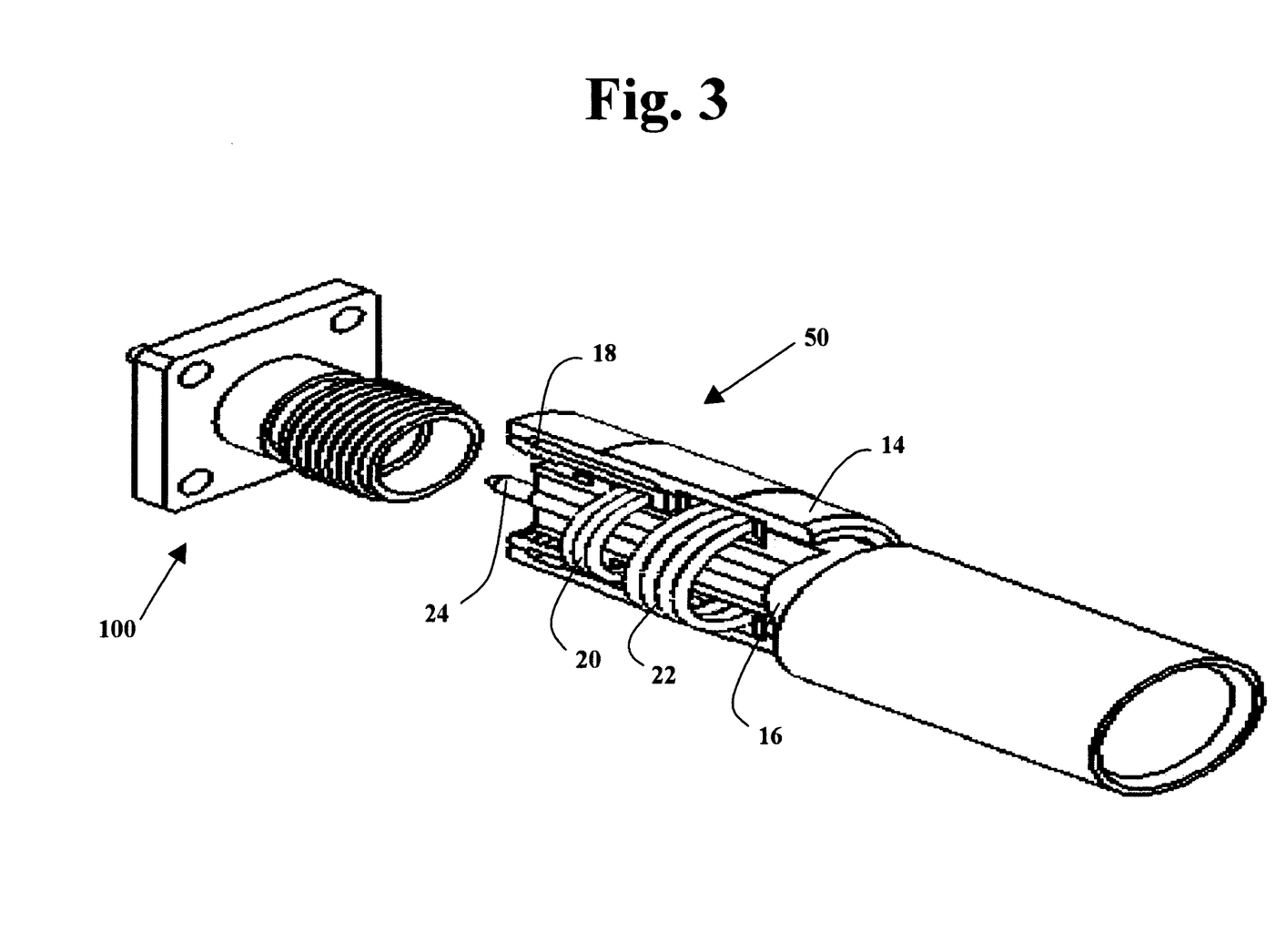
FIG. 3 is a perspective, cross-sectional view of the male coaxial connector of FIG. 1 illustrating the unmated, locked position of said male coaxial connector thereof.

Referring now to FIG. 3, a perspective, cross-sectional view of the male coaxial connector 50 is shown illustrating the unmated, locked position of said male coaxial connector 50. To provide inner electrical communication between the male coaxial connector 50 and the female connector 100, an inner conductor 24 of the male coaxial connector 50 is provided within the male connection member 16 and is adapted for receipt within the inner conductor region of the female connector 100 (not shown). In order to hold the female connection member 10 in place when it is inserted into the male coaxial connector 50, a spring basket 18 is adapted for receiving the female connection member 10. Again, this relationship will be discussed in further detail below. The sleeve 14 is axially movable with respect to the male connection member 16 in order to "open" the male coaxial connector 50 so that the male coaxial connector 50 can be fit over a female connector 100. Also, the first spring 22 biases the sleeve 14 into its locked position. These relationships will be explored in further detail below.

Figure 4A:
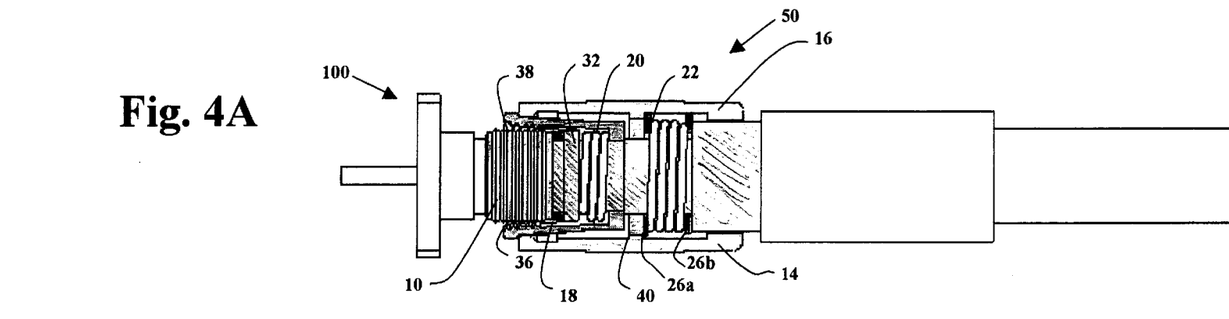
FIG. 4A is a side elevational, cross-sectional view of the male coaxial connector of FIG. 1 illustrating one of the mated, unlocked positions of said male coaxial connector thereof.
Figure 4B:
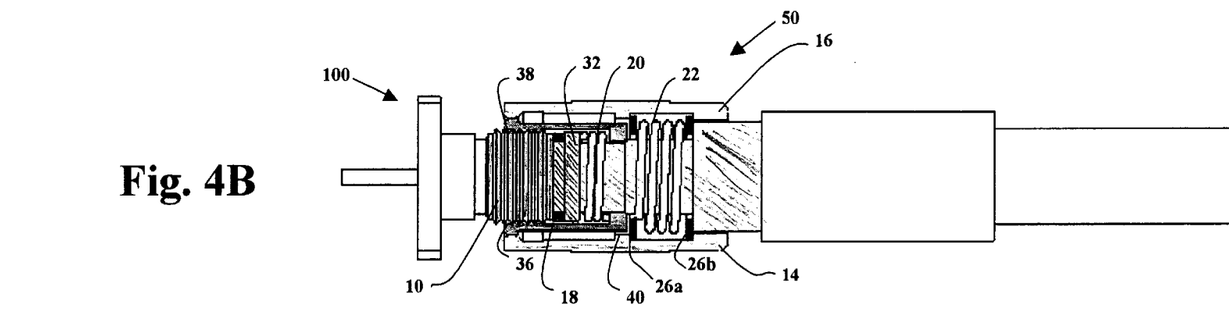
FIG. 4B is a side elevational, cross-sectional view of the male coaxial connector of FIG. 1 illustrating the mated, locked position of said male coaxial connector thereof.
Figure 4C:
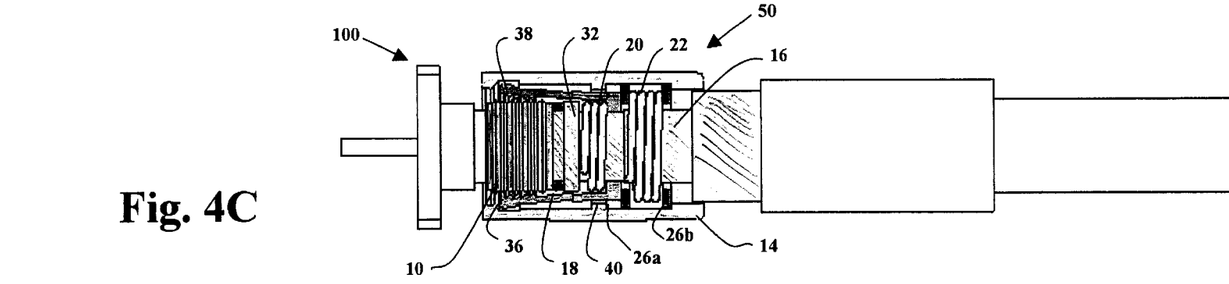
FIG. 4C is a side elevational, cross-sectional view of the male coaxial connector of FIG. 1 illustrating one of the mated, unlocked positions of said male coaxial connector thereof.

Referring now to FIGS. 4A–4C, one can obtain a better understanding of how the present invention operates. FIG. 4A is a side elevational, cross-sectional view of the male coaxial connector 50 of FIG. 1 illustrating the first mated, unlocked position of the male coaxial connector 50. FIG. 4B is a view of the mated, locked position of the male coaxial connector 50 and FIG. 4C is a view of the second mated, unlocked position of the male coaxial connector 50. FIGS. 4A and 4C illustrate the male coaxial connector 50 in an unlocked position. That is, the female connection member 10 is not secure within the male coaxial connector 50. To allow for withdrawal of the male coaxial connector 50 from the female connector 100, when the male coaxial connector 50 is in its unlocked position, the spring basket 18 is biased in an "open" position. That is, the spring basket 18 is biased at an angle away from the axis of the male coaxial connector 50 (see FIGS. 4A and 4C). Therefore, in its unlocked position, the male coaxial connector 50 can be removed from the female connector 100. A more detailed description of the structure of the spring basket 18 will be discussed below.

To install the male coaxial connector 50 on the female connection member 10 from an unmated position, the user grasps the sleeve 14 and pushes the male coaxial connector 50 toward the female connector 100. Washer 26b is then engaged by the forwardly moving sleeve 14. As the sleeve 14 is moved forwardly, the spring 22, washer 26a, and spring basket 18 slide toward the female connection member 10 along the male connection member 16. When the female connection member 10 abuts the head 32 of the male connection member 16, the force that the user is providing on the sleeve 14 compresses springs 20 and 22. All the parts sliding on the male connection member 16 are now jammed against the head 32 of the male connection member 16. The user then releases the sleeve 14 while holding the male connection member 16 firmly against the female connection member 10 (If he did not, the male connection member 16 might back away from the female connector 100 before the spring basket 18 lock on the threads of the female connection member 10, and electrical connection may suffer). Spring 22 now moves the sleeve 14 in a rearward direction to its default locked position.

Specifically referring now to FIG. 4A, the male coaxial connector is shown in its first unlocked position. In order to bias the sleeve 14 to a locked position, a first spring 22 fits around the male connection member 16 and provides axial forces against washers 26a and 26b. To translate the axial force from the first spring 22 to the sleeve 14, washer 26a abuts a first internal ridge 40 of the sleeve 14, thus urging the sleeve 14 towards a locked position when spring 22 is compressed (see FIG. 4B).

When the sleeve 14 is moved from its first unlocked position into its locked position (from its position in FIG. 4A to its position in FIG. 4B), a second internal ridge 36 of the sleeve 14 engages an external ridge 38 of the spring basket 18 forcing the internal threads of the spring basket 18 into engagement with the threads of the female connection member 10. This camming action provides forces on the female connection member 10 that not only keep the male coaxial connector 50 from disengaging from the female connector 100, but also provide good electrical communication between the female connection member 10 and the male connection member 16. Because the second internal ridge 36 of the sleeve 14 and the external ridge 38 of the spring basket 18 are rounded, the second internal ridge 36 is allowed to travel over the external ridge 38 of the spring basket such that the two ridges are substantially radially aligned when the male coaxial connector 50 is in its locked position. In addition to the radial compressive force on the female connection member 10 from the spring basket 18, a second spring 20 provides axial force on the male connection member 16 to force it into secure engagement with the female connection member 10. The second spring 20 fits around the male connection member 16 and applies axial force against the spring basket and the head 32 of the male connection member 16. Because the spring basket will not move with relation to the female connector 100 (due to their interlocked threads) the second spring 20 forces the head 32 of the male connection member 16 in a forward axial direction against the female connection member 10. Thus, the male coaxial connector of the present invention utilizes axial and radial forces to provide for secure electrical engagement between the male coaxial connector 50 and the female connector 100.

When the sleeve 14 is moved from the locked position into its second unlocked position (from its position in FIG. 4B to its position in 4C), the second internal ridge 36 of the sleeve 14 moves out of radial alignment with the external ridge 38 of the spring basket 18 such that the spring basket is allowed to open such that its axial length is at an angle from the axis of the male coaxial connector 50 and the male coaxial connector 50 can be removed from the female connector 100. To bias the sleeve 14 toward its locked position when it is in its second unlocked position, both the first spring 22 and second spring 20 are compressed which apply axial forces on the sleeve 14 relative to the male connection member 16 urging the sleeve 14 back to its locked position.

Figure 5:
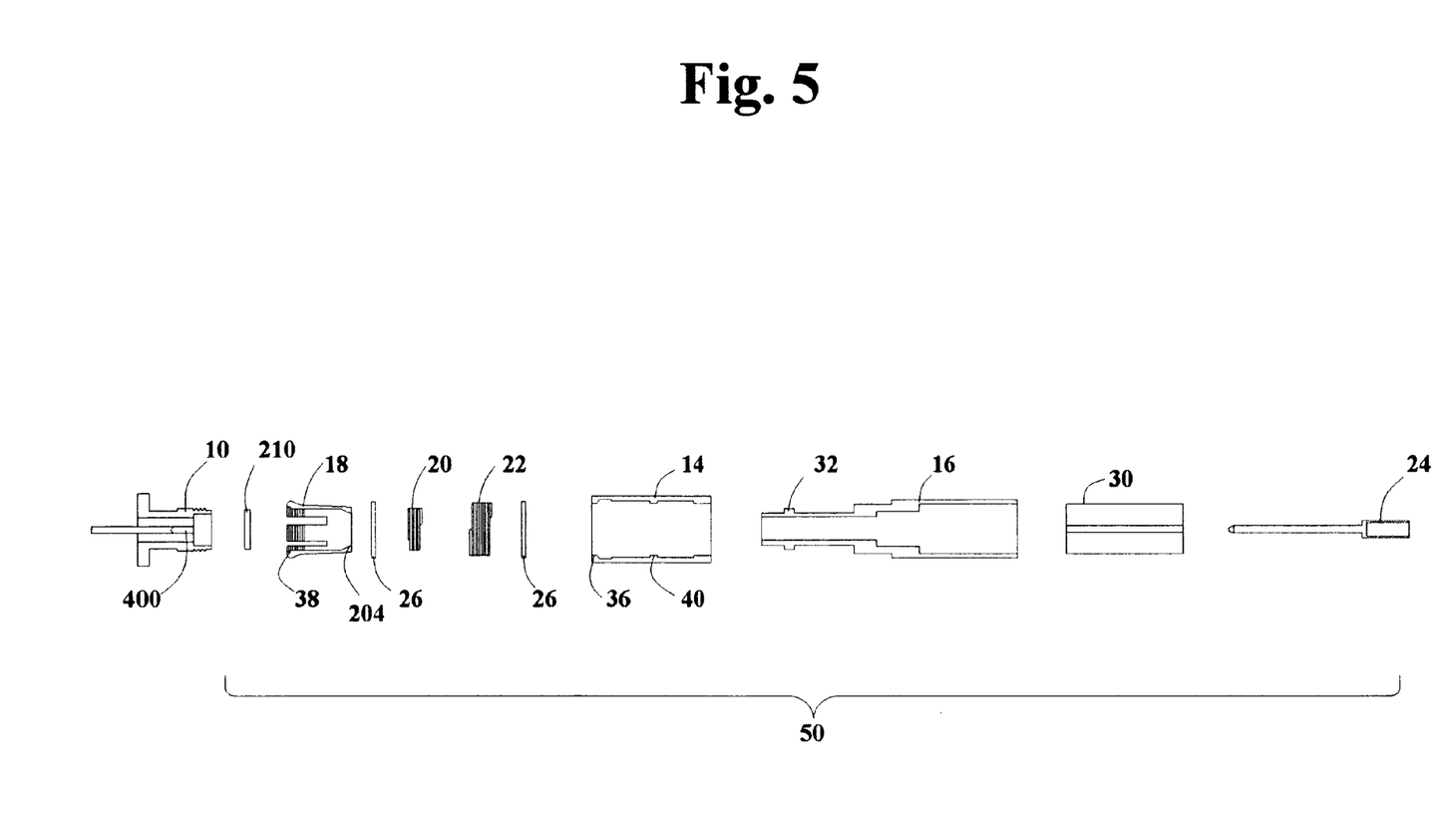
FIG. 5 is a cross-sectional, exploded view of the male coaxial connector and the female connector of FIG. 1.

Referring now to FIG. 5, a cross-sectional, exploded view of the male coaxial connector 50 and the female connector 100 of FIG. 1 is shown. The inner conductor 24 is of a size such that, when assembled, it fits securely within a hole through the male insulator 30. Likewise, the male insulator 30 is of a size that it fits securely within the male connection member 16. In order to facilitate the internal electrical connection between the male coaxial connector 50 and the female connector 100, the front end of the inner conductor 24 protrudes from the male connection member 16 a distance sufficient to come into electrical contact with the female inner conductor 400 when the connectors are mated. It is well known in the industry to utilize rubber, plastic or the like as insulating material within coaxial connectors, and likewise the use of brass, copper and similar electrically-conducting material for the construction of the conducting portions of the male coaxial connector 50, as well as the female connector 100. To bias the male coaxial connector 50 to its locked position and to urge the male connection member 16 toward the female connector 100 when mated, the second spring 20 is assembled around the male connection member 16 such that it abuts the head 32 on the male connection member 16; the other end of the second spring 20 abuts a ridge 204 in the interior of the spring basket 18. The first spring 22 is positioned around the male connection member 16 and sandwiched between washers 26*a* and 26*b* such that it also biases the male coaxial connector 50 to its locked position. To keep the spring basket 18 from being removable from the male coaxial connector 50, the ridge 204 on the spring basket 18 fits over and around the head 32 on the front of the male connection member 16. To allow the male coaxial connector 50 to be locked and unlocked, the sleeve 14 is axially movable with respect to, and fits over, the spring basket 18 and the male connection member 16 assembly. Gasket 210 fits over the frontal portion of the head 32 of the male connection member 16 to help prevent water ingress into the interior of the coaxial cable attached to the male coaxial connector 50.

It may thus be seen that the present invention provides an advance over other coaxial cable conductors by providing enhanced electrical connectivity with quick and reliable interconnection between a male coaxial connector 50 and a female connector 100 by providing radial force to secure the female connector 100 and providing radial and axial forces to enhance the electrical connection between the male coaxial connector 50 and the female connector 100. The unlocking of the male coaxial connector 50 can be done simply by pushing or pulling the sleeve 14 in an axial direction with respect to the male connection member 16.

Figure 6:
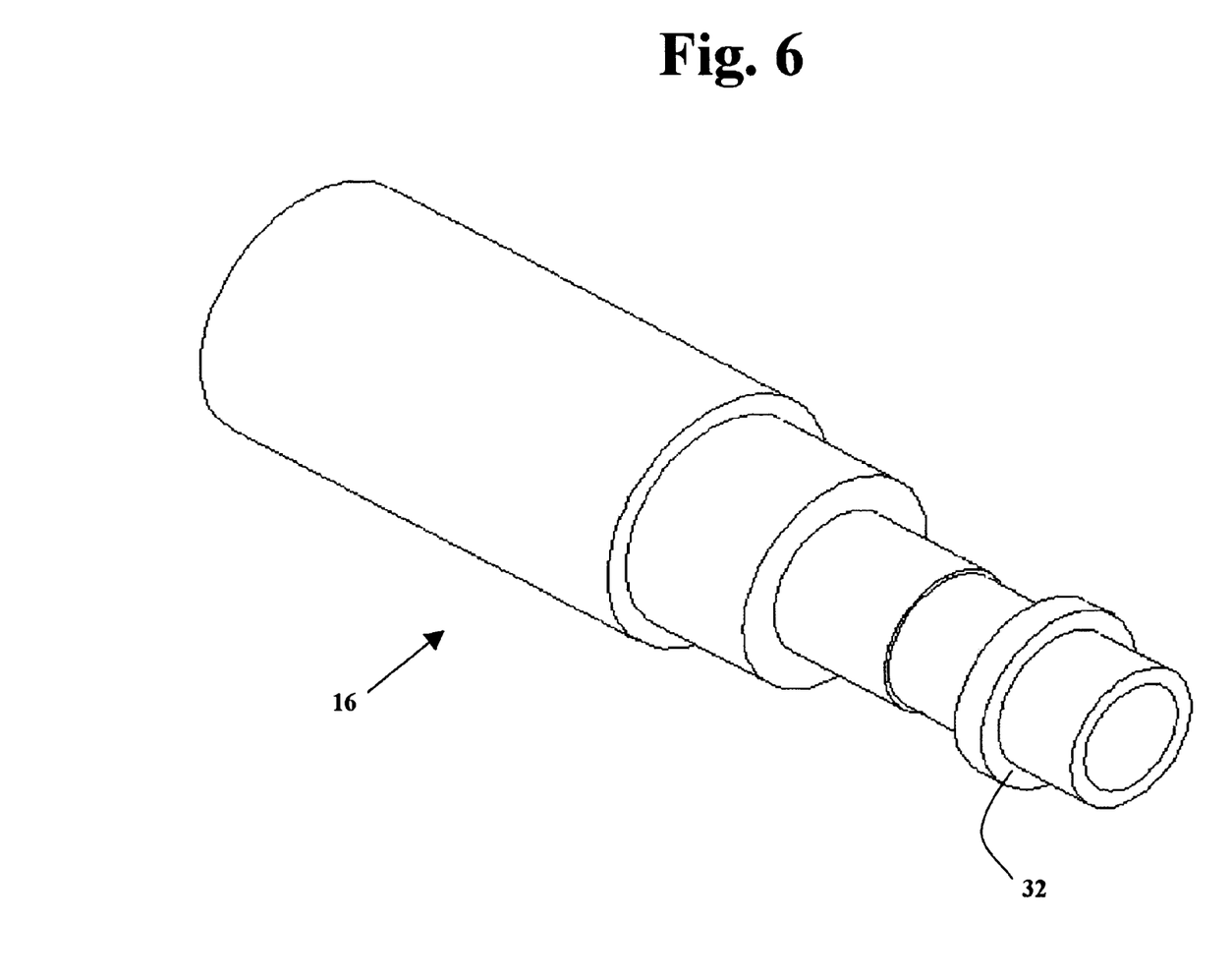
FIG. 6 is an enlarged, perspective view of the connection member of the male coaxial connector of FIG. 5.

Referring now to FIG. 6 there is shown an enlarged, perspective view of the male connection member 16 of FIG. 5. In order to provide electrical communication between the male connection member 16 and the female connection member 10 when the male coaxial connector 50 is mated and locked to the female connector 100 (these two pieces act as the outer conductor of the resulting coaxial connection), the male connection member 16 should be made of electrically conductive material. Optionally, the male connection member 16 may be wrapped, covered, or otherwise fit with a non-conductive material. However, the portions of the head 32 of the male connection member 16 and the female connection member 10 that are in contact with each other when the male coaxial connector 50 is in its mated and locked position should not be wrapped, covered, or otherwise fit with a non-conductive material because they need to electrically communicate with each other. To allow second spring 20 to apply axial force on the male connection member 16 when compressed, the head 32 has a radially extending ridge that the second spring 20 abuts. In order to accommodate the male insulator 30 and the inner conductor 24, the male connection member is hollow. When the inner conductor 24, male insulator 30, and male connection member 16 are assembled the front end of the inner conductor 24 protrudes from the male connection member 16 a distance sufficient to come into electrical contact with the female inner conductor (not shown) when the connectors are mated.

Figure 7:
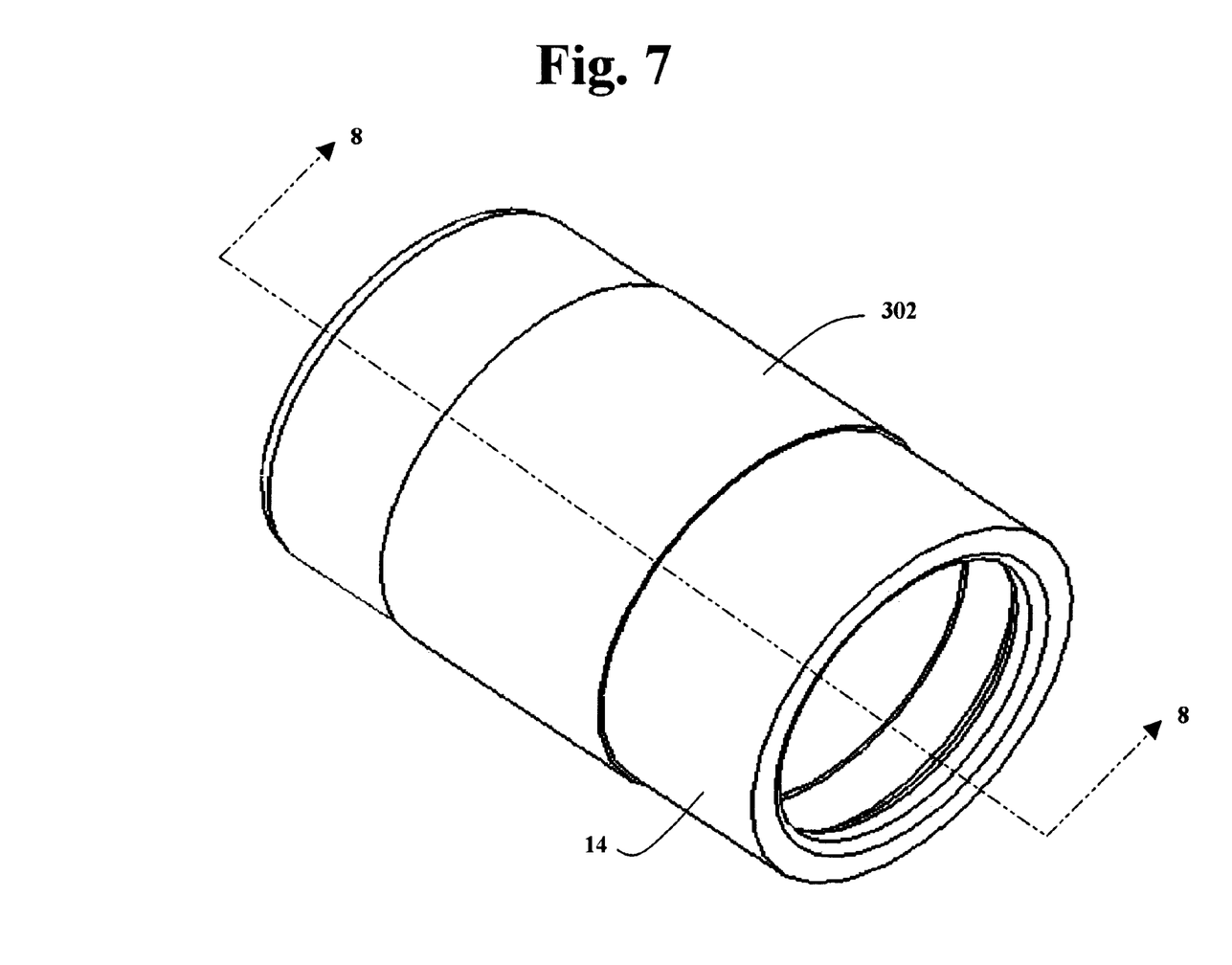
FIG. 7 is an enlarged, perspective view of the sleeve of the male coaxial connector of FIG. 5.

Referring now to FIG. 7, there is shown an enlarged perspective view of the sleeve 14 of FIG. 5. To accommodate the various portions of the male coaxial connector 50, the sleeve 14 is preferably hollow. As stated above, to move the male coaxial connector 50 to its locked or unlocked position relative to the female connector 100, the sleeve is moved in a forward or rearward axial direction with respect to the spring basket 18. This may be done by a user gripping the outside of the sleeve 14 and pushing or pulling it in an axial direction relative to the spring basket 18. In order to give the user a better grip on the sleeve 14, the sleeve may have a raised area 302. Alternatively, the raised area 302 may be textured or be made of a material with a relatively high coefficient of friction such that the user may more easily grip the sleeve 14. In another embodiment, the sleeve 14 does not have a raised area, but the entire external surface of the sleeve is textured, coated, or covered with a material with a relatively high coefficient of friction.

Figure 8:
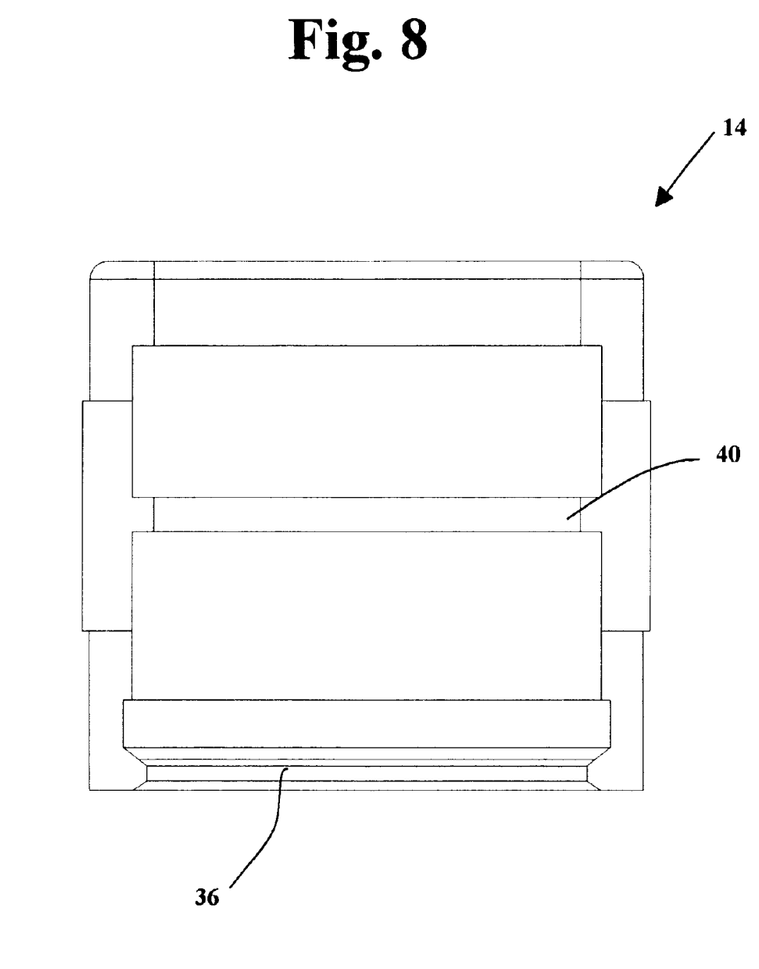
FIG. 8 is an enlarged, cross-sectional view of the sleeve of FIG. 7 taken along line 3—3.

Referring now to FIG. 8, a cross-sectional view taken along line 3—3 of the sleeve 14 of FIG. 7 is shown. As stated above, In order to bias the sleeve 14 to a locked position from its first unlocked position (FIG. 4A), a first spring 22 fits around the male connection member 16 and provides axial forces against washers 26*a* and 26*b*. To translate the axial force from the first spring 22 to the sleeve 14, one of the washers abuts a first internal ridge 40 of the sleeve 14, thus urging the sleeve 14 towards a locked position (see FIGS. 4A and 4B). When the male coaxial connector 50 is moved from one of its unlocked positions to the locked position, the second internal ridge 36 engages the external ridge 38 of each respective tine 42 of the spring basket 18, forcing the tines 42 into engagement with the female connection member 10 and applying radial compressive forces thereupon. To allow for movement of the sleeve 14 over the external ridge 38 (referred to here in the singular even though there are a number of external ridges 38 of the spring basket 18 because the spring basket 18 is divided into tines 42) the second internal ridge 36 of the sleeve 14 is rounded.

Figure 9:
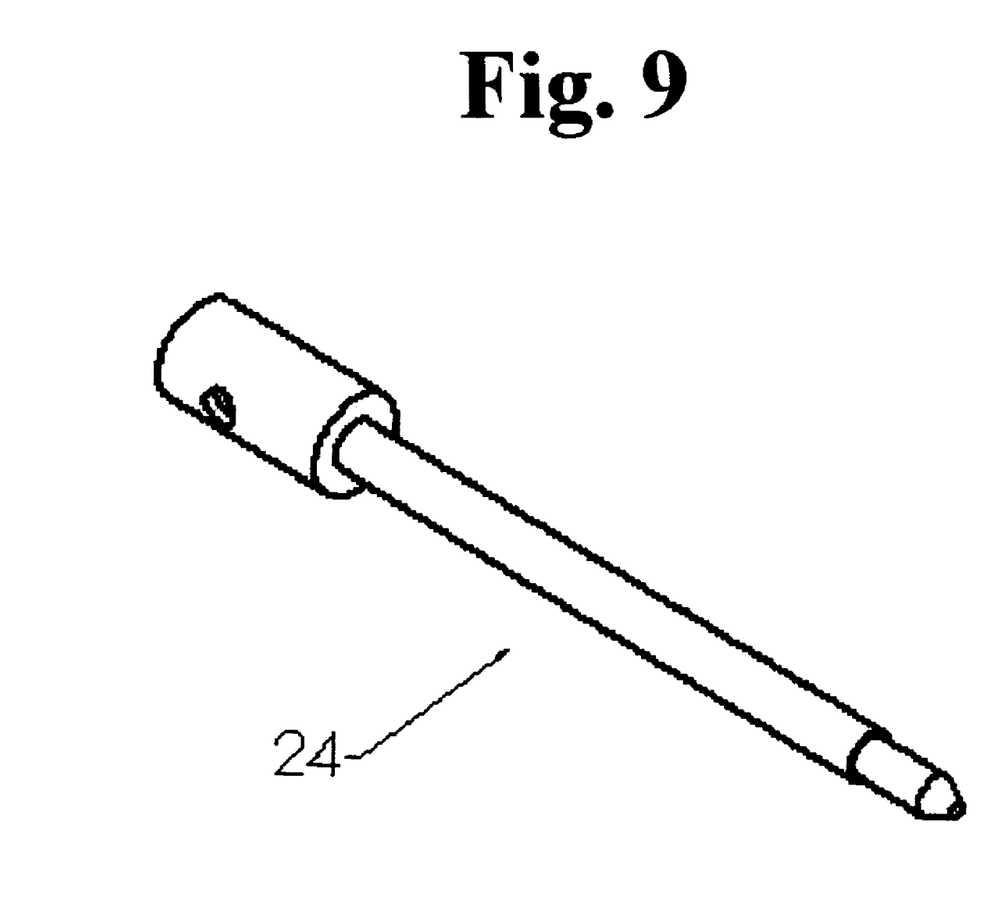
FIG. 9 is an enlarged, perspective view of the inner conductor of FIG. 5.

Referring now to FIG. 9 there is shown an enlarged, perspective view of the inner conductor 24. In order to provide electrical communication between a standard coaxial cable (not shown) and the female inner conductor (not shown) the inner conductor 24 must be made of an electrically conductive material. As stated above, to ensure a secure fit between the inner conductor 24 and the male insulator 30, the diameter of the front portion of the inner conductor 24 is approximately the same as the diameter of the hole formed through the male insulator 30. When the inner conductor 24, male insulator 30, and male connection member 16 are assembled, the front portion of the inner conductor 24 protrudes in an axial direction outwardly from the male connection member 16. This protrusion allows the inner conductor 24 to be received within the female inner conductor when the male coaxial connector 50 is engaged with a female connector 100. To work for its intended purpose, the male coaxial connector 50 of the present invention must be connected to a coaxial cable. U.S. Pat. No. 5,802,710, assigned to the assignee of the present invention, and incorporated herein by reference, teaches a method of attaching a connector to a coaxial cable that allows the depth of the inner conductor 24 relative to the male connection member 16 to be easily controlled. In this manner, the depth of the inner conductor 24 relative to the male connection member 16 is consistent from one assembly to the next. The method set forth therein also provides a moisture barrier between the cable and the connector without the use of rubber O-rings, thereby protecting the connector from detrimental environmental conditions. The male coaxial connector 50 of the present invention may be to either corrugated coaxial cables or smooth-walled coaxial cables.

Referring again to FIG. 5, in order to allow front end of the spring basket 18 to compress evenly upon the female connection member 10 when it is inserted therein, the frontal portion of the spring basket 18 is divided into equally spaced tines 42. Each tine 42 has an external ridge 38 that engages the second internal ridge 36 of the sleeve 14 and translates axial force from the sleeve 14 into radial compressive forces onto the female connection member 10. In order to provide better gripping forces on a threaded female connection member 10 of a female connector 100, the internal faces of the tines 42 are threaded to engage the threads on the female connection member 10. Also, in order to hold the spring basket 18 in place with respect to the male connection member 16, a ridge 204 on the spring basket 18 fits over and around the head 32 on the front of the male connection member 16.

It is thus believed that the operation and construction of the present invention will be apparent from the foregoing description. While the method and apparatus shown or described has been characterized as being preferred it will be obvious that various changes and modifications may be made therein without departing from the spirit and scope of the invention as defined in the following claims:

What is claimed is:

1. A male coaxial connector adapted for receiving a female connection member, said male coaxial connector defining an axial direction along its major axis, said connector comprising:

a spring basket biased towards an open position and positioned around a male connection member, said spring basket being adapted for engaging said female connection member;

a sleeve reciprocally positioned around said spring basket and said male connection member, said sleeve being movable in said axial direction with respect to said spring basket such that when said sleeve is in a forward position or rearward position with respect to said spring basket said spring basket is in an open position wherein said female connection member can be released from or inserted into said spring basket, and when said sleeve is in a neutral position with respect to said spring basket said sleeve is in engagement with said spring basket forcing said spring basket into a closed position such that said spring basket applies a radially compressive force on said female connection member; and a first spring positioned around said male connection member, said spring providing an axial force on said male connection member forcing said male connection member into engagement with said female connection member and a second spring positioned around said male connection member wherein said second spring biases said sleeve towards said neutral position with respect to said spring basket.

2. The male coaxial connector of claim 1 wherein said spring basket comprises a plurality of tines adapted to radially compress said female connection member.

3. The male coaxial connector of claim 2 wherein said plurality of tines are threaded and wherein said female connection member is threaded.

4. The male coaxial connector of claim 1 wherein said first spring biases said sleeve towards said neutral position with respect to said spring basket.

5. The male coaxial connector of claim 1 wherein the outside surface of said sleeve is covered with a material having a relatively high coefficient of friction to allow a user to more easily grip said sleeve.

6. The male coaxial connector of claim 1 wherein the outside surface of said sleeve is textured to allow a user to more easily grip said sleeve.

7. The male coaxial connector of claim 1 wherein said male connection member is made of electrically conductive material.

8. The male coaxial connector of claim 7 further comprising an inner conductor positioned within said male connection member and electrically isolated from said male connection member.

9. The male coaxial connector of claim 1 wherein said spring basket has an inward-facing lip on the rear portion thereof adapted to fit over and around a head on the frontal portion of said male connection member.

10. The male coaxial connector of claim 1 further comprising a gasket positioned around the male connection member to help prevent the ingress of moisture therein.

11. The male coaxial connector of claim 2 wherein the sleeve has a rounded internal ridge that is adapted for engaging a plurality of rounded external ridges on said plurality of tines on said spring basket such that said sleeve is allowed to move to said forward position and said rearward position with respect to said spring basket when sufficient axial force is applied to said sleeve.

12. A male coaxial connector adapted for receiving a female connection member, said male coaxial connector defining an axial direction along its major axis, said connector comprising:

means for receiving said female connection member;

means for securing said female connection member in a locked position;

means for applying a radial compression force on said female connection member;

means for applying an axial force on said male connection member such that when said male coaxial connector is in a locked position, said axial force urges said male connection member into electrical engagement with said female connection member;

means for unlocking said male coaxial connector by moving at least a component of said male coaxial connector in a forward axial direction with respect to said female connection member; and means for unlocking said male coaxial connector by moving at least a component of said male coaxial connector in a rearward axial direction with respect to said female connection member.

13. The male coaxial connector of claim 12 further comprising means for biasing said coaxial connector towards a locked position.

14. The male coaxial connector of claim 12 wherein means are provided to allow a user to more easily grip said male coaxial connector.

15. The male coaxial connector of claim 12 wherein means are provided to prevent moisture from entering a coaxial cable that said male coaxial connector is connected to when said male coaxial connector is connected to a female connector.

16. A method of locking a female connection member into secure electrical engagement with a male connection member, said method comprising:

providing a spring basket around said male connection member, said spring basket having an open front end and being biased toward an open unlocked position;

providing a sleeve around said male connection member and said spring basket, said sleeve being movable in an axial direction with respect to said spring basket such that when said sleeve is moved to a forward axial position or a rearward axial position with respect to said spring basket said spring basket is in its open unlocked position;

providing a first spring around said male connection member;

inserting said female connection member into said front end of said spring basket; and applying an axial force on said sleeve with respect to said spring basket of sufficient magnitude such that said sleeve is forced into a locked position, said sleeve translating a portion of said axial force into a radial compression force on said female connection member and said first spring translating a portion of said axial force into an axial force urging said male connection member into electrical engagement with said female connection member; and a second spring around said male connection member, said second spring biasing said sleeve toward a locked position.

17. The method of claim 16 wherein said spring basket comprises a plurality of tines adapted to radially compress said female connection member.

18. The method of claim 17 wherein said plurality of tines are threaded and wherein said female connection member is threaded.

19. A push-on, pull-off male coaxial connector configured to be snapped on or off a female connection member, comprising:

a body having an axis, said body acting as a male connection member on said axis which is adapted to penetrate said female connection member when said male coaxial connector is connected to said female connection member;

locking elements annularly spaced around said body and configured to move between a radial outward position in which the elements can pass said female connection member, and a radially inward position wherein said elements engage and are locked onto said female connection member; and a reciprocal sleeve around said body and said locking elements, said sleeve and said locking elements having a cooperating camming arrangement configured such that: (1) when said sleeve is in a forward position, said camming arrangement permits said locking elements to be in said radially outward position and unlocked from said female connection member, (2) when said sleeve is in a steady state intermediate position, said camming arrangement forces said locking elements into said radially inward position and locked on said female connection member, and (3) when in a rearward position, said camming arrangement permits said locking elements to be in said radially outward position and unlocked from said female connection member; and spring means captured between a locking mechanism body part and a spring capture provision on said body such that said spring means urges said body firmly against said female connection member when said male coaxial connector is connected to said female connection member and said locking mechanism are locked on said female connection member.

20. The male coaxial connector defined by claim 19 wherein said locking mechanism is a spring basket with arms being open in a radially outward position when in a relaxed state.

21. The male coaxial connector defined by claim 19 including a return spring structure acting upon said sleeve to return it to said steady state intermediate position.

22. The male coaxial connector defined by claim 19 wherein said spring means is slidably retained on said body and is captured between a radially inward protrusion on said locking means and a radially outward protrusion on said body.

23. The male coaxial connector defined by claim 19 wherein said female connection member has threads and the locking mechanism is adapted to mate with said threads.

24. The male coaxial connector defined by claim 21 wherein said camming arrangement comprises an annular, radially inwardly extending cam on said sleeve which engages displaces a radially outwardly extending cam follower on the distal end of said locking mechanism.

25. A push-on, pull-off male coaxial connector configured to be snapped on or off a female connection member, comprising:

a body having an axis, said body acting as a male connection member on said axis which is adapted to penetrate said female connection member when said male coaxial connector is connected to said female connection member;

an annular basket around said body having annularly spaced arms configured to move between an open, radial outward position in which the arms can slide over and embrace said female connection member, and a closed, radially inward position wherein said arms engage and are locked onto said female connection member; and a reciprocal sleeve around said body and said basket, said sleeve and said basket arms having a cooperating camming arrangement configured such that: (1) when said sleeve is in a forward position, said camming arrangement permits said arms to be open and unlocked from said female connection member, (2) when said sleeve is in a steady state intermediate position, said camming arrangement forces said arms into said closed position and locked on said female connection member, and (3) when in a rearward position, said camming arrangement permits said arms to be open and unlocked from said female connection member; and spring means captured between a basket body part and a spring capture provision on said body such that said spring means urges said body firmly against said female connection member when said male coaxial connector is connected to said female connection member and said arms are locked on said female connection member.

26. The male coaxial connector defined by claim 25 wherein said basket is a spring basket with arms being open when in a relaxed state.

27. The male coaxial connector defined by claim 25 including a return spring structure acting upon said sleeve to return it to said steady state intermediate position.

28. The male coaxial connector defined by claim 25 wherein said spring means is slidably retained on said body and is captured between a radially inward protrusion on said basket and a radially outward protrusion on said body.

29. The male coaxial connector defined by claim 25 wherein said female connection member has threads and the distal end of the arms which lock on said female connection member are adapted to mate with said threads.

30. The male coaxial connector defined by claim 25 wherein said camming arrangement comprises an annular, radially inwardly extending cam on said sleeve which engages displaces a radially outwardly extending cam follower on the distal end of each of said arms.

31. A push-on, pull-off male coaxial connector configured to be snapped on or off a female connection member, comprising:

a body having an axis, said body acting as a male connection member on said axis which is adapted to penetrate said female connection member when said male connector is connected to said female connection member; and connector retention means for securing said male coaxial connector on said female connection member with said body spring-forced against said female connection member for improved electrical contact, comprising:
  a basket slidably retained on said body and having arms adapted to lockingly engage said female connection member, and
  spring means slidably retained on said body and captured between a first spring capture provision on said basket and a second spring capture provision on said body such that said spring means urges said second spring capture provision, and thus said body, firmly against said female connection member when said basket arms are locked on said female connection member.

32. The connector defined by claim 31 wherein said basket is a spring basket with said arms being open when in a relaxed state.

33. The connector defined by claim 31 including a sleeve surrounding said basket and adapted when moved axially to cause said basket arms to lock on said female connection member.

34. The connector defined by claim 33 wherein said sleeve includes a cam which causes said basket arms to lock on said female connection member when said sleeve is in a predetermined position.

35. The connector defined by claim 34 wherein said cam on said sleeve comprises an annular, radially inwardly extending protrusion which engages and displaces a radially outwardly extending cam follower on the distal end of each of said arms.

36. The connector defined by claim 31 including a return spring structure acting upon said sleeve to return it to said predetermined position.

37. The connector defined by claim 31 wherein said female connection member has threads and the distal ends of the arms which lock on said female connection member are adapted to mate with said threads.

* * * * *